United States Patent [19]

Pietras et al.

[11] Patent Number: 5,412,766
[45] Date of Patent: May 2, 1995

[54] DATA PROCESSING METHOD AND APPARATUS FOR CONVERTING COLOR IMAGE DATA TO NON-LINEAR PALETTE

[75] Inventors: Mark A. Pietras, Boynton Beach, Fla.; Arturo A. Rodriguez, Belmont, Calif.

[73] Assignee: International Business Machines Incorporated, Armonk, N.Y.

[21] Appl. No.: 964,236

[22] Filed: Oct. 21, 1992

[51] Int. Cl.⁶ ................................................ G06T 5/20
[52] U.S. Cl. ..................................................... 395/131
[58] Field of Search .......................... 395/131, 132, 126; 345/133; 348/34, 931

[56] References Cited

U.S. PATENT DOCUMENTS 5,138,303  8/1992  Rupel.
5,243,447  9/1993  Bodenkamp et al. ............... 345/133
5,298,893  3/1994  Sekine ................................. 345/63

FOREIGN PATENT DOCUMENTS 0501023  of 0000  United Kingdom .......... H04N 1/46

OTHER PUBLICATIONS

Computers & Graphics, Sudhir S. Dixit, 1991, vol. 15, No. 4, pp. 561–567, Quantization of Color Images for Display/Printing on Limited Color Output Devices * pp. 563–564; FIGS. 2, 3, 4 *.
Systems and Computers in Japan, Watanabe, 1990, vol. 21, No. 10, New York, USA, pp. 68–77, Improved Dithering Methods for Color Quantized Images * the whole document *.

*Primary Examiner*—Heather R. Herndon
*Assistant Examiner*—Mike Smith
*Attorney, Agent, or Firm*—Bernard D. Bogdon

[57] ABSTRACT

A personal computer system has source of input video data containing digitized pixel color values, and a display operated with palette quantized colors including non-linear palette quantized colors. A conversion table is stored in the system for converting blocks of pixel color values into palette colors, the conversion table comprising a plurality of error diffusion arrays covering the color range of pixel color values. Each array in the conversion table corresponds to a different color value, each array being accessed using said corresponding color value as an index into said table. Each array in the table has "n" fields respectively containing palette color values ordered in accordance with an order matrix by sorted luminance values.

31 Claims, 4 Drawing Sheets

DATA PROCESSING METHOD AND APPARATUS FOR CONVERTING COLOR IMAGE DATA TO NON-LINEAR PALETTE

BACKGROUND OF THE INVENTION

This invention relates to the field of data processing, and, more particularly to an improved method and apparatus for converting color image data to a generally non-linear palette.

Color space and depth conversion is a long standing problem with image displaying applications because of the numerous options for both storage and display. A common format for color data storage is RGB16 where there are five bits of red significance, six bits of green significance, and five bits of blue significance. The format can be expressed as R5:G6:B5 and stored as one 16-bit word.

One format for a display is an 8-bit palette environment which is typically found in graphical user interfaces (GUIs). This type of environment defines 256 colors, where each color component generally has six bits of significance. The components are either RGB, YUV, or one of their many variations. With such a system, a maximum of 256 colors can be simultaneously defined on a screen. Hence, a conversion must be done by mapping the original 16-bit color data to one of the 256 available colors. Since most colors in an image tend to not exactly match one of the 256 available colors, artifacts will appear.

A very common artifact is called "contouring". Since an 8-bit display has only 256 distinct colors, a GUI will use a general palette that spans the entire color spectrum thus allowing any application needing to display a color to have a reasonable approximation to the desired color. A general palette typically results in a very quantized color space (i.e., large differences in incremental color shades may exist). When there is a gradual change of colors across an image such as blue skies, shadows, or facial tones, some colors in a region may map to one quantized color and other colors on the other side of the region may map to a different quantized color. This difference of colors is noticeable and results in visual lines or arcs, called "contour lines".

A known method of making contour lines less noticeable is to add ordered "noise" to the colors prior to conversion. The noise in effect changes how rounding to the closest quantized color is done such that an area of color between two palette entries is displayed by alternating the quantized colors of the two palette entries to create a sort of blurring mesh effect over the area. Although this method is somewhat effective, it requires substantially numerical computations thus making it unacceptable for software-only real-time video decompression and display. First, the converter must add the noise. For instance, if a 1 is added to the blue component of RGB16 format, there might be a carry into the green. Thus, a check must be made to see that the blue component will not carry into green prior to the addition. It is tempting to stop at this point and do the conversion. However, the only contour lines that are blurred are distinctly blue areas such as the sky, but not shadows nor facial tones. Furthermore, the color shifts towards the blue and produces a blue tint across the image. To compensate for this, equal amounts of noise need to be added to each color component to most closely preserve the original color. The final result is alternating brighter and darker pixels across the image. If the additive noise pattern is ordered diagonally such that the pixels alternate both horizontally and vertically, and the image has sufficient resolution (e.g., 640 by 480 pixels), then human perception tends to average the luminance difference and the alternating brighter and darker pixels are unlikely to be noticeable.

The additive noise pattern just described can be defined by the following 2×2 dither matrix:

| 0 | 1 |
|---|---|
| 1 | 0 |

A better quality dither matrix would have more levels of noise variation, such as:

| 0 | 3 |
|---|---|
| 2 | 1 |

A dither matrix such as the latter one, more closely approximates the desired color. However, its disadvantage is that the order of computational complexity of adding and clamping color components is significantly higher.

Another disadvantage of employing a routine that converts 16-bit color data to a palette, generally non-linear, is that 256 color comparisons must be made for every pixel on the screen. This is particularly true when the non-linearly quantized values of each (or any) of the three color primaries in the palette are not stored in a sorted sequence. Each color comparison entails the following: a subtract, a check for a negative result, a possible negate, a compare with the previous closest color's three components, a possible update, and loop control. Such procedure has to be performed 256 times for each pixel to be displayed (i.e., once for each of 256 colors in the palette). The complexity of such conversion may be too high for still image applications, and is unacceptable for software-only decompression and display of digital video on low-end platforms such as personal computers with 386 and 486 class microprocessors.

SUMMARY OF THE INVENTION

One of the objects of the invention is to provide improved apparatus and method for mapping original color data into a palette of generally non-linearly spaced colors by a rapid conversion technique that produces very high quality images.

Another object of the invention is to provide an improved rapid method that uses error diffusion coupled with ordered dither to reduce artifacts in converting color data to a sorted palette and a non-linear and not necessarily sorted palette.

A further object of the invention is to perform conversion on a real time basis in a personal computer so as to reduce processor requirements while retaining image quality.

Still another object of the invention is to provide conversion for multimedia application for rapidly converting and displaying images and/or video without the need for additional image handling hardware.

Briefly, in accordance with the invention, a personal computer system has a source of input video data containing digitized pixel color values, and a display operated with palette quantized colors. A conversion table is stored in the system for converting blocks of pixel color values into palette colors, the conversion table comprising a plurality of error diffusion arrays covering the color range of pixel color values. Each array in the conversion table corresponds to a different color value, each array being accessed using said corresponding color value as an index into said table. Each array in the table has "n" fields respectively containing palette color values ordered in accordance with an order matrix by sorted luminance values.

DRAWINGS

Other objects and advantages of the invention will be apparent from the following description taken in connection with the accompanying drawings wherein.

DETAILED DESCRIPTION

Figure 1:
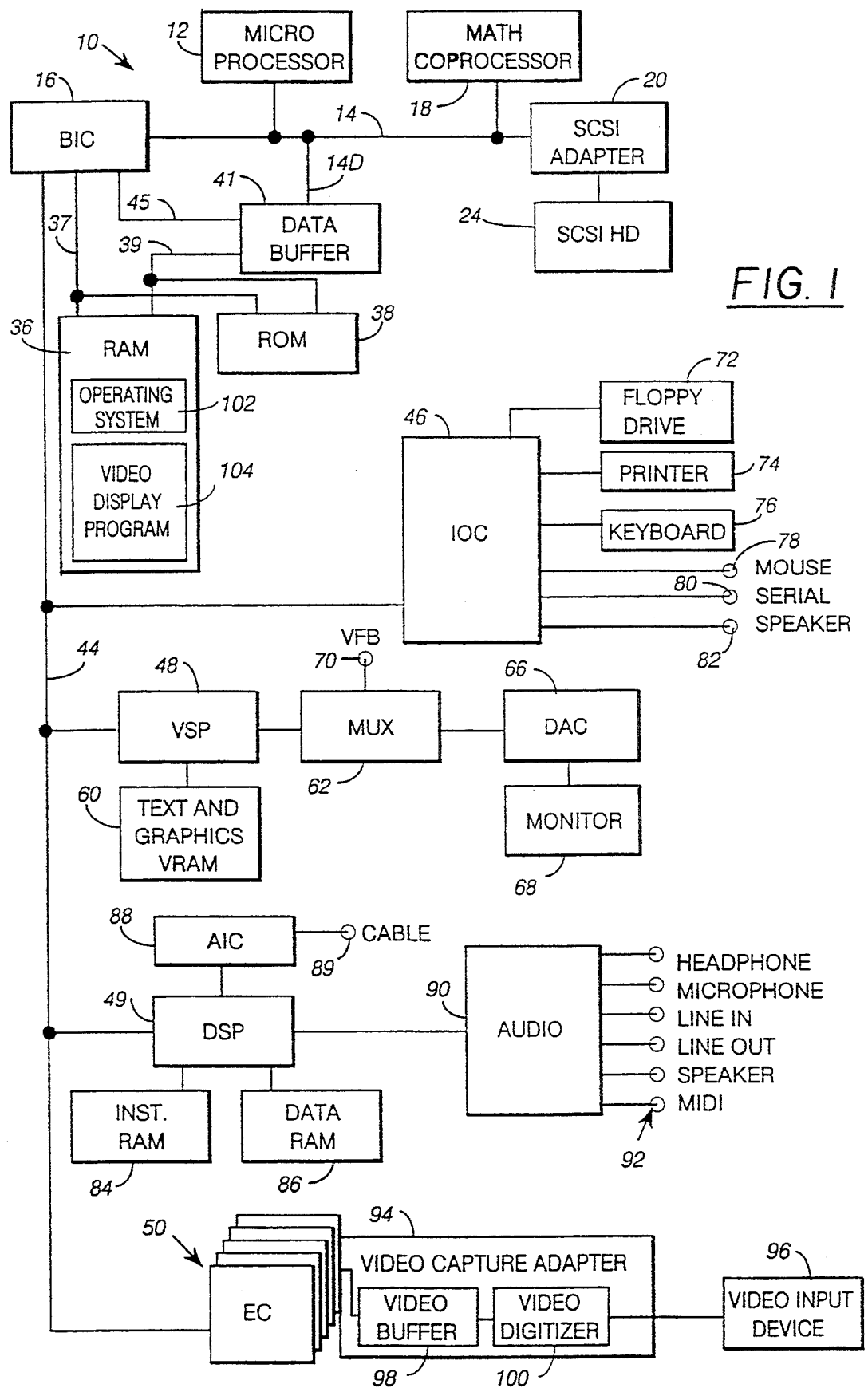
FIG. 1 is a block diagram of a personal computer system embodying the invention.

Referring now to the drawings, and first to FIG. 1, there is shown an exemplary multimedia data processing system (DPS) comprising a personal computer 10 operable under a multitasking operating system such as OS/2 (trademark of IBM Corp.) Version 2.0, to execute application programs. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80xxx microprocessors, such as an 80386 or a 80486 microprocessor, and local bus 14 includes conventional data, address, and control lines conforming to the architecture of such a processor. Adapter 20 is also connected to a SCSI hard drive (HD) 24 which functions, among other functions, to store files of data compressed in accordance with the invention as described in more detail below.

BIC 16 performs two primary functions, one being that of a memory controller for accessing a random access memory (RAM) 36 and a read only memory (ROM) 38. RAM 36 is a dynamic random access memory that functions as the main memory for storing data and programs for execution by microprocessor 12 and math coprocessor 18. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an expansion bus 44 designed in conformance with Micro Channel (trademark of IBM Corporation) (MC) architecture. Bus 44 is further connected to an input/output controller (IOC) 46, a video signal processor (VSP) 48, a digital signal processor (DSP) 49, and a plurality of expansion connectors (EC) or slots 50. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 68 and to a connector or terminal 70 that is connectable to a video feature bus (VFB). DAC 66 is connected to monitor 68 that provides a conventional output screen or display for viewing by a user.

IOC 46 controls operation of plurality of I/O devices including a floppy disk drive 72, a printer 74, and a keyboard 76. Drive 72 comprises a controller (not shown) and a removable floppy disc or diskette (not shown). IOC 46 also is connected to a mouse connector 78, a serial port connector 80, and a speaker connector 82 which allow various optional devices to be connected into the system.

DSP 49 is further connected to an instruction RAM 84, a data RAM 86, an analog interface controller (AIC) 88, and an audio controller (90). RAMs 84 and 86 respectively hold instructions and data used by DSP 49 for processing signals. Audio controller 90 controls various audio inputs and outputs and is connected to a plurality of connectors 92 by which various devices can be connected to the system. Such devices include a headphone, a microphone, a speaker, a musical instrument digitizing interface (MIDI), and devices requiring an audio line-in and line-out functions.

Memory 36 stores various programs for execution in the system, which programs include an operating system (OS) 102 and a video display program (VDP) 104. Program 104 is an application program that runs under the operating system and has various threads, discussed below, that are concurrently executed as multitasks, to provide real time video display on monitor 68 of images from a video input device 96 such as a video camera. Device 96 is connected to a video digitizer 100 in a video capture adapter 94. A video buffer 98 is also included in adapter 94 and is connected to receive uncompressed motion video data from digitizer 100. Adapter 94 is connected through an expansion connector 50 to bus 44 and the rest of the system allowing the adapter and video input device to be operated under the control of video display program 104.

Figure 2:
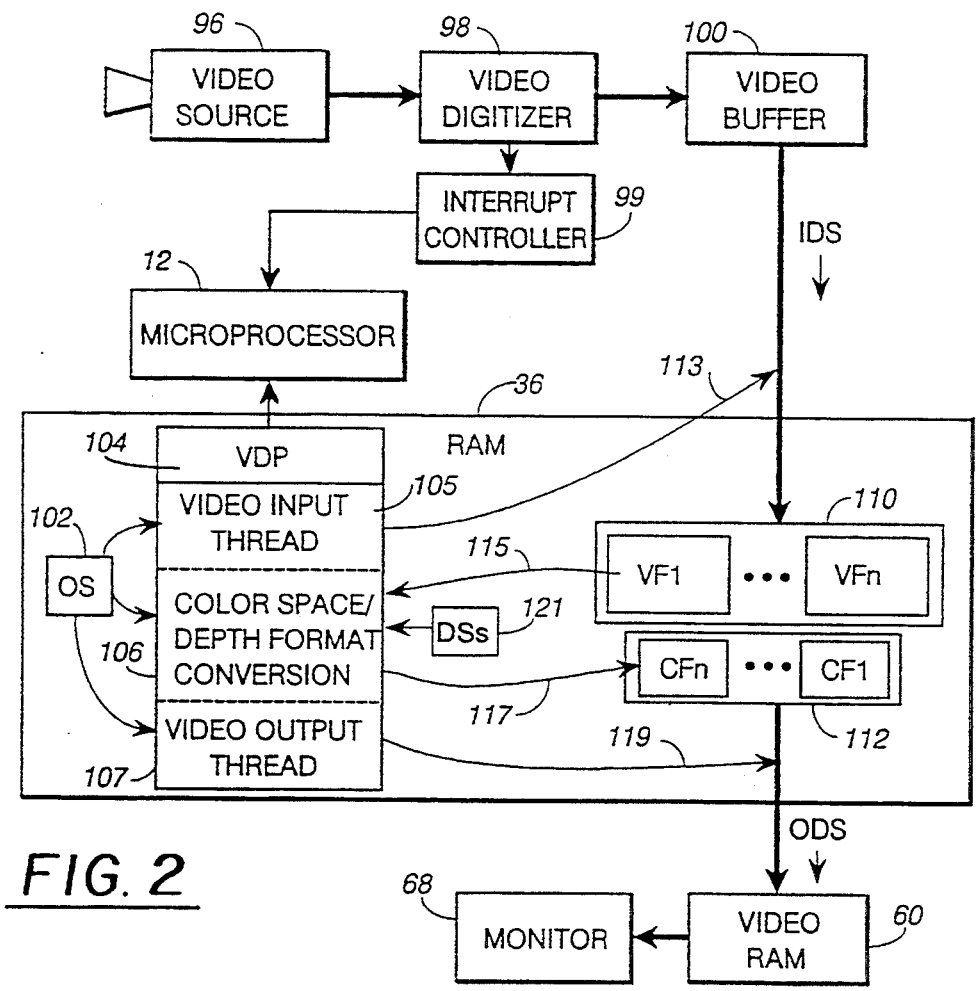
FIG. 2 is a schematic diagram illustrating the primary data flow in accordance with the invention.

The primary flow of video data in the system, while VDP 104 is being executed, is schematically shown in FIG. 2, to which reference will now be made. The flow of data occurs along the thicker lines in this figure and starts with analog data from video camera 96, which is transmitted into digitizer 98. Digitizer 98 converts the analog input into pages or frames of digitized data and transmits the frames into video buffer 100. Each frame comprises a number of pixel values corresponding to the number of pixels used to capture the momentary "picture" or image seen by the video source. Each digitized pixel value contains 16-bits (two bytes) of information represented in the well known RGB16 (red-green-blue) format of five bits for the red value, six bits for the green value, and five bits for the blue value. The frames in video buffer 100 are uncompressed and are transmitted in an input data stream (IDS) as video frames VF having a sequence of pixel values PV1-PVn (where "n" corresponds to the number of pixels per screen image) into a data input buffer 110 in RAM 36 to form a first-in, first-out (FIFO) queue of video frames VF1-VFn. After each frame has been processed and converted, it is placed in an output buffer 112 of RAM 36 as a FIFO queue of converted frames CF1-CFn from where the frames are sequentially transmitted in an output data stream (ODS) to video RAM 60 for display on monitor 68. The rate of data flow in the data streams is at normal video rate so that the conversion is accomplished in real time at such rate.

The general operation described in the preceding paragraph is under the control of microprocessor 12. When digitizer 98 converts enough samples of the analog input to complete a frame, it sends an interrupt signal to interrupt controller 99 which in turn transmits an interrupt request to microprocessor 12 causing an interrupt handler to produce a signal allowing a video input thread 105 to copy the completed frame to queue 110. Thread 104 may also provide scaling of the data. Thread 104 is part of VDP 104 which operates under the control of OS 102 along with a color space/depth format conversion thread 105 and a file writer thread 107, on a multitasking basis. These threads create a data stream in which raw digitized video data is inputted in the IDS from buffer 100 into RAM 36, converted by thread 106 in the manner described in detail below, and transmitted to video RAM 60 for display.

In a conventional way of multitasking, each of the threads is sequentially alloted a separate execution time by OS 102 so as to impart a perception to a user that all three threads are being executed simultaneously when in fact the microprocessor executes only one thread at a time at high speed. Video input thread 105 controls the filling of input buffer 110 with frames of digitized data from video buffer 100. Conversion thread 106 processes frames from buffer 110 one-at-a-time, converts the color format as described below, and writes converted frames to buffer 112. During the course of such processing, thread 106 accesses information in various data structures (DSs) 121 stored in RAM 36. Video output thread 107 writes the frames from buffer 112 in RAM 60. The control over such functions is represented in FIG. 2 by the respective lines 113, 115, 117, and 119.

Figure 3:
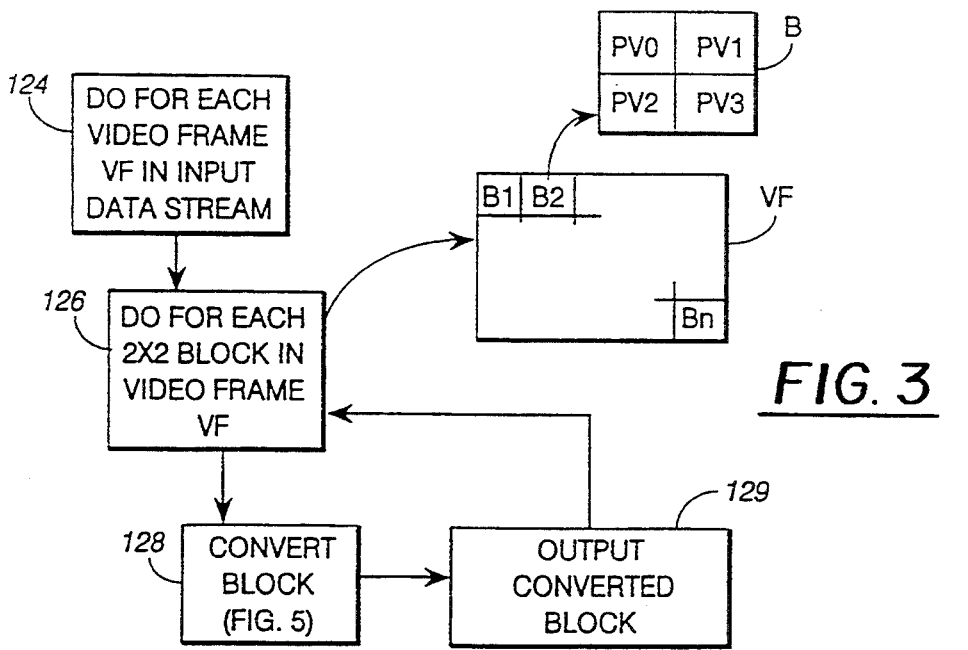
FIG. 3 is a flow chart of the overall conversion process.

FIG. 3 illustrates the general operations that occur during execution of thread 105. The general process 124 is a DO loop in which each video frame VF in the IDS that is placed in buffer 110 is processed in accordance with steps 126, 128, and 129. To better understand such operation, a video frame VF is shown in the upper right of FIG. 3 and is logically divided into a plurality of adjacent, non-overlapping blocks B1–Bn with each block B containing four pixel values PV0–PV3 arranged in a 2×2 square or matrix. The color values for individual pixels in a block can be readily extracted from the input series, knowing the number of pixels per frame, the number of pixels per image line, and the number of pixels per block. Thus, step 126 performs a DO loop on each block B in a video frame to convert each block by step 128, which is described in more detail below relative to FIG. 5. When step 126 completes, and all of the blocks B from a frame have been converted to form a converted frame, step 129 then outputs the converted block for transmission to the video RAM.

Figure 4:
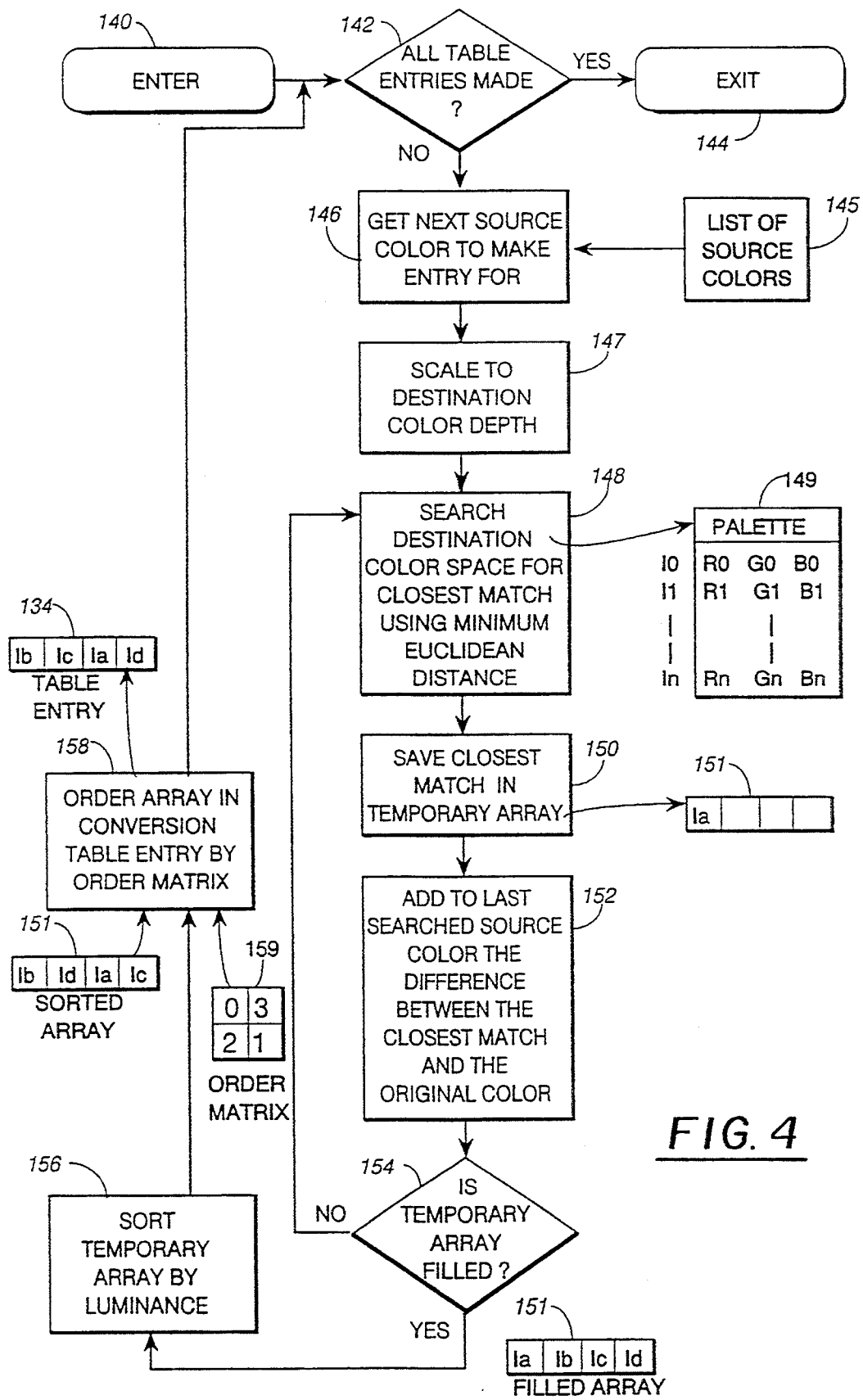
FIG. 4 is a flow chart illustrating how the conversion table shown in FIG. 5 is constructed.

The conversion process described below relative to FIG. 5 uses a conversion table 134 that needs to be constructed and stored in RAM 36 before or at the start of the process shown in FIG. 3 and described above. The conversion table is made on the basis of an RGB24 color space. Such conversion table is constructed as illustrated in FIG. 4, to which reference is now made. After entry through 140, step 142 establishes a loop control decision which causes the loop beginning with step 146 to be performed until all the entries in table 134 have been made and completed. Step 146 accesses a list 145 of source colors and obtains one-at-a-time, the next source color for which an entry is to be made in table 134. Step 147 scales each source color value to the destination color depth. For example, the destination color depth is RGB14, while the input is RGB16. Step 148 then searches the destination color space 149, for the closest match using minimum Euclidean distance. The "destination color space" is palette 149 containing a plurality of RGB entries accessible through a palette index value In. The "Euclidean distance" is the square root of the sum of the squares of the differences between the color components of the source and the destination colors. Next, step 150 saves the palette index to the closest match in a temporary array 151 having four fields into which entries are made into sequential fields one per each pass through the loop. On the first pass, entry Ia is made, On the second pass, entry Ib is made, etc. Array 151 to the right of step 150 is illustrated as containing only the first index Ia from the first pass.

Step 152 then adds to the last source color that was searched, the difference between the closest match and the original color. Step 154 decides if the temporary array has been filled. Since the array has four fields, the first three passes through step 154 produces a negative decision causing control to branch back to step 148 to repeat the process using the value resulting from step 152. Upon completion of the fourth pass, temporary array 151 is filled with four palette indexes Ia, Ib, Ic, and Id, and step 156 then sorts such entries by luminance. Assuming the order of luminance of colors indexed by the illustrated indexes is Ib, Id, Ia, and Ic, array 151 at the completion of step 156 contains the sorted indexes in the order from left to right of Ib, Id, Ia, and Ic.

Step 158 then writes the palette index entries from the sorted array into conversion table 134 in accordance with order matrix 159. The entries in the order matrix specify the order in which the fields of the entry are to be placed in array 134. The upper left value in matrix 159 contains a value of "0" indicating the first field in 151 should be placed in the first field of array 134. The upper right value in matrix 159 contains a value of "3" indicating the fourth field from 151 should be placed in the second field of 134, The lower left value in matrix 159 contains a value of "2" indicating the third field from 134 should be placed in the third field of 134. The lower right value in matrix 159 contains a value of "1" indicating the second field from 151 should be placed in the fourth field of 134.

The completed entry in table 134 is an error diffusion array or spreading color luminance over a block. The specific array resulting from the example being used in FIG. 4, includes, in order from left to right, the values Ib, Ic, Ia, and Id. Upon completion of step 158, step 142 is repeated. After all the source colors have been processed and all table entries made, conversion table 134 is complete and constitutes a look-up table containing a plurality of arrays or entries that can be accessed using the base address of the table and a palette index as an offset into the table.

The following example demonstrates how one entry in conversion table 134 can be created from a single source color. Assume that palette 149 contains 256 entries the first ten of which are the following:

| INDEX | R | G | B |
| --- | --- | --- | --- |
| 0 | 0 | 0 | 235 |
| 1 | 0 | 16 | 240 |
| 2 | 0 | 32 | 245 |
| 3 | 0 | 48 | 250 |

-continued

| INDEX | R | G | B |
|---|---|---|---|
| 4 | 0 | 64 | 255 |
| 5 | 12 | 0 | 235 |
| 6 | 12 | 16 | 240 |
| 7 | 12 | 32 | 245 |
| 8 | 12 | 48 | 250 |
| 9 | 12 | 64 | 255 |

Assume further that a pixel value of R:1,G:5, and B:15 in RGB14 format is scaled to an RGB24 format of R:8, G:41: and B:255. The following table list the various Euclidean distances resulting from step 148 performing three successive passes as a function of the palette index and the, exemplary, non-linear quantized colors in the palette:

| INDEX | R | G | B | EUCLIDEAN DISTANCES | | | |
|---|---|---|---|---|---|---|---|
| | | | | PASS1 | PASS2 | PASS3 | PASS4 |
| 0 | 0 | 0 | 235 | 46.31 | 42.39 | 56.71 | 54.40 |
| 1 | 0 | 16 | 240 | 30.23 | 27.20 | 42.11 | 41.10 |
| 2 | 0 | 32 | 245 | 15.65 | 15.65 | 29.83 | 31.30 |
| 3 | 0 | 48 | 250 | 11.75 | 17.66 | 23.85 | 28.86 |
| 4 | 0 | 64 | 255 | 24.35 | 30.68 | 28.46 | 35.33 |
| 5 | 12 | 0 | 235 | 45.79 | 42.95 | 55.44 | 53.96 |
| 6 | 12 | 16 | 240 | 29.43 | 26.91 | 40.36 | 40.51 |
| 7 | 12 | 32 | 245 | 12.21 | 17.12 | 27.31 | 30.53 |
| 8 | 12 | 48 | 250 | 9.49 | 18.97 | 20.62 | 28.02 |
| 9 | 12 | 64 | 255 | 23.35 | 31.45 | 25.81 | 34.64 |

During each pass, the Euclidean distance between each palette color and the input color is calculated. By way of example, the Euclidean distance for input color R:8, G:41, AND B:255 and the first palette color at index 0 is calculated as follows:

| INPUT COLOR | 8 | 41 | 255 |
|---|---|---|---|
| PALETTE COLOR | 0 | 0 | 235 |
| DIFFERENCE | 8 | 41 | 20 |
| DIFFERENCE SQUARED | 64 | 1681 | 400 |
| SUM OF SQUARES | 2145 | | |
| SQUARE ROOT (EUCLIDEAN DISTANCE) | 46.31 | | |

The resultant value "46.31" is the Euclidean distance and is the first entry in the PASS1 column. The other Euclidean distances are calculated in the same manner. On pass PASS1, the closest distance is entry 9.49 which corresponds to index "8". Therefore, Ia is set to a value of "8". Step 152 then adds the error difference between each of the components in entry 8 to the components of the original color as follows:

$Red1 = Red + (Red - Red\_entry\_8) = 8 + (8-12) = 4$ $Green1 = Green + (Green - Green\_entry\_8) = 41 + (41-48) = 34$ $Blue1 = Blue + (Blue - Blue\_entry\_8) = 255 + (255-250) = 260$ The result is a color value of R:4, G:48, B:260 that is processed by step 148 to produce the distances in PASS2 where the distance of 15.65 at index 2 is the closest. Thus, Ib=2. By adding the component errors in the manner of the preceding paragraph, a color value of R:12, G:43, B:270 is obtained in which the minimum distance of 25.81 in PASS3 corresponds to an index of 8 which becomes Ic. A further pass uses a minimum distance of 23.02 corresponding to index 8, which then becomes Id. When such values are sorted by luminance in step 156 and ordered by step 158, an array of 2:8:8:8: is entered in table 134. When an input block is of a uniform color R:8, G:41, B:255, the converted block resulting therefrom will cause a 2×2 pixel region to display the color as:

| [0, 32, 245] | [12, 48, 250] |
|---|---|
| [12, 48, 250] | [12, 48, 250] |

Figure 5:
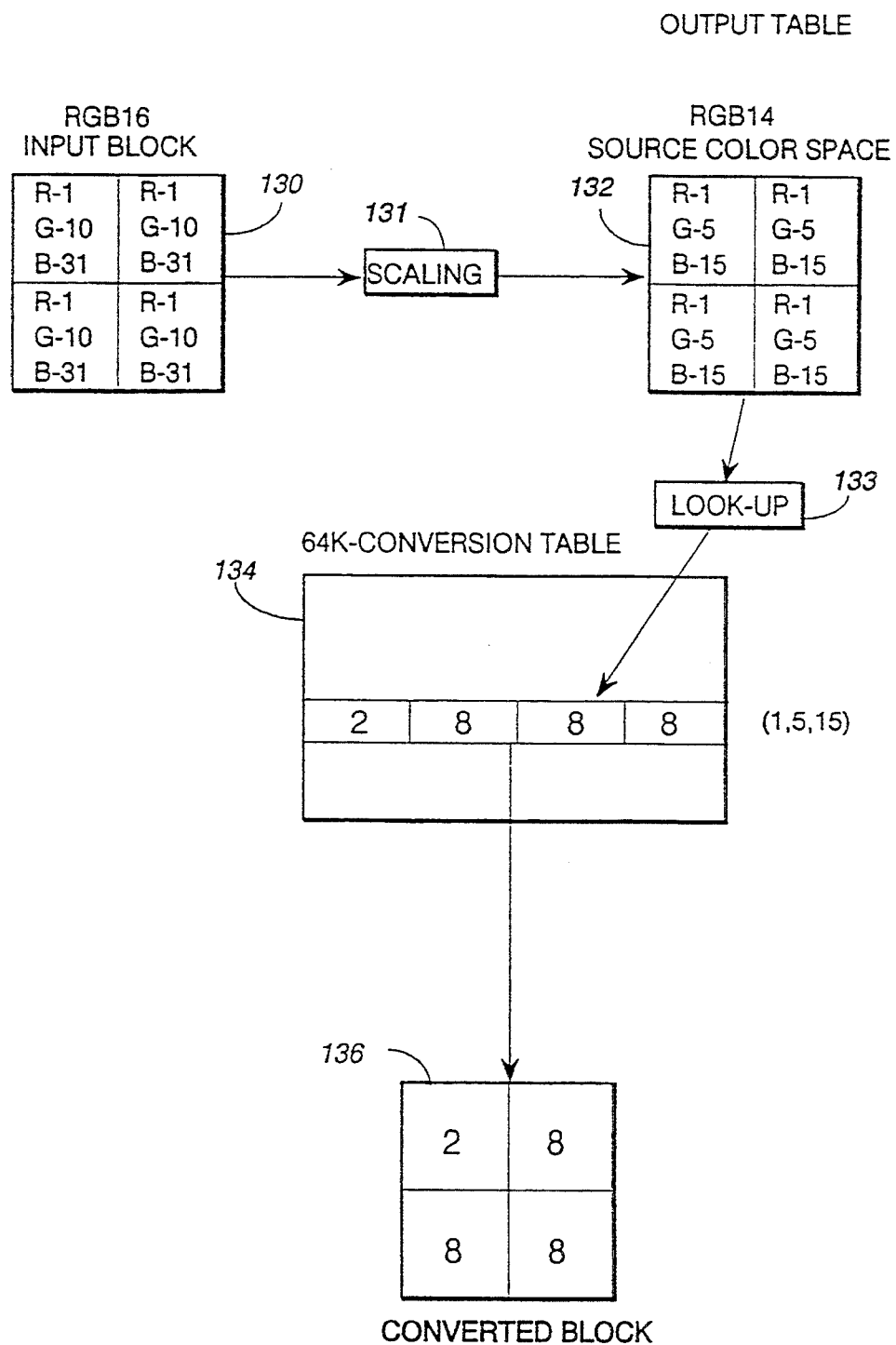
FIG. 5 is a flow diagram for block conversion of color data in accordance with the invention.

Refer now to FIG. 5. As indicated above, each block being converted contains four color values of a 2×2 square of pixels. The input block 130 contains four pixel values PV0–PV3 in RGB16 format. Since the conversion table is based on RGB14 format, the input values are first scaled by step 131 to place in source color space block 132 color values in the RGB14 format. Such color values are then used by step 133 to look up, one at a time, the entries corresponding thereto in table 134 and place entries in table 136 dependent on the position of the color value in the block. That is, the color value in the upper left of block 132 is used to lookup its corresponding array in table 134 and the first palette index in such array is placed in the upper left of block 136, the color value in the upper right is used to lookup its corresponding array in table 134 and the second palette index in such array is placed in the upper right of block 136, etc. After block 136 is filled, the next input block 130 is accessed and the process repeated.

In an image region of uniform color, each block will have the same color value for each pixel so that all four values in the input block are the same. By converting the blocks as described above, the invention avoids artifacts in a field of gradually changing colors and overcomes the problems noted above. FIG. 5 illustrates the values used when the input block is of a uniform color R:1, G:10, and B: 31, which is the same input color used in the example previously discussed. If the input block does not have a uniform color, the same process is used but the result will produce only pseudo error diffusion.

The invention can be thought of as a replacement of ordered additive "noise" in a 2×2 matrix with an ordered "color approximation". Instead of adding ordered additive noise to the image to smooth over the pixels, the invention smoothes the error introduced by mapping the original color value of a pixel to a quantized color value in the non-linear palette, generally by spreading the error to the surrounding pixels. On a display of sufficient resolution, the eye will "average" the diffused color error (or difference) to produce the closest approximation of the color over a local area.

One important advantage of the invention is that the computational complexity of converting is done before the pixels are converted on a real time basis by creating table 134. The converting is thus reduced to a table lookup and is performed at much greater speeds then if the computations were done for each input color value and it is inputed into the system. Another important advantage of the invention is that it provides a "software-only" solution to the problem. The term "software-only" means that the solution uses only standard personal computer components, including a RAM and a microprocessor, operating under program control to perform the conversions without requiring any additional specialized hardware and resultant higher cost.

While the conversion operation above have been described relative to the use of uncompressed source input for displaying images from a video camera, it should be obvious to those skilled in the art that with obvious adaptations, the method can be used with compressed input that would have to be decompressed before conversion, and using other source devices such as a video file from a hard disk, CD ROM, etc. It should also be apparent to those skilled in the art that many changes can be made in the details and arrangements of steps and parts without departing from the scope of the invention as defined in the appended claims.

What is claimed is:

1. The method of operating a personal computer system having a main memory for storing data and programs including a multitasking operating system, a microprocessor for executing programs stored in said main memory, a source of frames of video data with each frame comprising a series of digitized pixel color values, and a video display device for displaying video data comprising a series of palette colors, wherein said method comprises the steps of:
   (a) storing in said main memory a conversion table having a plurality of created error diffusion arrays covering the color range of said pixel color values, each array in said table being for a different corresponding color value, each array being accessed using said corresponding color value as an index into said table, each array in said table having "n" fields respectively containing palette color values ordered in accordance with an order matrix by sorted luminance values, said palette color values being from a non-linear palette of quantized colors;
   (b) storing in said main memory a series of input pixel color values from said source;
   (c) processing said input pixel color values in blocks wherein each block has "n" values corresponding to "n" laterally and vertically adjacent pixels on a screen, said processing being done by
      (c1) converting each block of input pixel color values into a corresponding converted block containing palette colors, by looking up in said conversion table for each input pixel color value in said each block the array indexed by such color value, and by setting a corresponding value in said corresponding converted block to a preordered palette color from such array;
      and (c2) transmitting to said video display device said palette colors from said converted block.

2. The method of operating a personal computer system in accordance with claim 1 wherein said conversion table is created by:
   (d) storing in said main memory a non-linear palette of quantized palette colors;
   (e) for each different pixel color value, creating a corresponding array in said conversion table by
      (e1) calculating, for each palette color in said palette, a Euclidean distance between such palette color and a first pixel color value from said series of input pixel color values,
      (e2) selecting a first palette color corresponding to which palette color has a minimum Euclidean distance from the first pixel color value,
      (e3) selecting (n−1) additional palette colors by adding color error differences between said first pixel color value and a palette color last selected to form a search color, by calculating Euclidean distances between said search color and each palette color in said palette, and by selecting another palette color having a minimum Euclidean distance,
      (e4) sorting said first palette color and (n−1) additional palette colors selected by said preceding steps in accordance with luminance thereof,
      (e5) reordering said palette colors as sorted by said preceding step in accordance with an order matrix,
      and (e6) storing said palette colors as reordered by said preceding step in consecutive fields of said corresponding array in said conversion table.

3. The method of operating a personal computing system in accordance with claim 2 wherein:
   each block is a 2×2 block of pixel values, and "n" equals four to provide the first, a second, a third and a fourth palette color, and a first, a second, a third and a fourth field of each array.

4. The method of operating a personal computer system in accordance with claim 3 wherein:
   said order matrix stores the respective first, second, third and fourth palette colors as sorted by luminance, respectively, in the first, fourth, third, and second fields of the array being created.

5. The method of operating a personal computer system in accordance with claim 2 wherein:
   step (b) stores said input pixel color values in said main memory in input frames;
   and step (c2) collects said palette colors in output frames corresponding to said input frames, and transmits said output frames to said video display device.

6. The method of operating a personal computer system in accordance with claim 5, wherein said processing step (c) is done at a rate which is equal to the rate at which input pixel color values are produced from said source, and said processing is done as a separate task under said operating system concurrently with receiving video data from said source and transmitting said output frames to said video display device, whereby said converting is done on a real-time basis.

7. The method of operating a personal computer system in accordance with claim 6, comprising expressing said palette colors in said converted blocks as palette indexes, and transmitting such indexes to said video display device.

8. The method of operating a personal computer system in accordance with claim 2 comprising:
   expressing said input pixel color values in a first format, identifying other color values other than the input pixel color values for accessing said conversion table in a second format, and scaling said input pixel color values in said first format to said second format to thereby access said conversion table.

9. A personal computer system including a main memory for storing data and programs including a multitasking operating system, a microprocessor for executing programs stored in said main memory, a source of video data inputting a succession of frames of digitized pixel color values, and display means for displaying images colored in accordance with a non-linear palette of quantized colors, further comprising:
   first means for receiving and storing in said main memory a succession of said digitized pixel color values;
   a conversion table stored in said main memory, said conversion table containing a plurality of error diffusion arrays covering the color range of said pixel color values, each array in said table being for a different corresponding color value, each array being accessed using said corresponding color value as an index into said table, each array in said table having "n" fields respectively containing palette color values ordered in accordance with an order matrix by sorted luminance values, said palette color values being from a non-linear palette of quantized colors;

second means for processing said input pixel color values in blocks wherein each block has "n" values corresponding to "n" laterally and vertically adjacent pixels on a screen, said processing being done by converting each block of input pixel color values into a corresponding converted block containing palette colors, by looking up in said conversion table for each input pixel color value in said each block the array indexed by such color value, and by setting a corresponding value in said corresponding converted block to a preordered palette color from such array;

and third means for transmitting to said display said palette colors from said converted block.

10. A personal computer system in accordance with claim 9 wherein said conversion table is created by:
(d) storing in said main memory a non-linear palette of quantized palette colors;
(e) for each different pixel color value, creating a corresponding array in said conversion table by
(e1) calculating, for each palette color in said palette, a Euclidean distance between such palette color and a first pixel color value from said digitized pixel color values,
(e2) selecting a first palette color corresponding to which palette color has a minimum Euclidean distance from the first pixel color value,
(e3) selecting (n−1) additional palette colors by adding color error differences between said first pixel color value and a palette color last selected to form a search color, by calculating Euclidean distances between said search color and each palette color in said palette, and by selecting another palette color having a minimum Euclidean distance,
(e4) sorting said first palette color and (n−1) additional palette colors selected by said preceding steps in accordance with luminance thereof,
(e5) reordering said palette colors as sorted by said preceding step in accordance with an order matrix,
and (e6) storing said palette colors as reordered by said preceding step in consecutive fields of said corresponding array in said conversion table.

11. A personal computing system in accordance with claim 10 wherein:
each block is a 2×2 block of pixel values, and "n" equals four to provide the first, a second, a third and a fourth palette color, and a first, a second, a third and a fourth field of each array.

12. A personal computer system in accordance with claim 11 wherein:
said order matrix is operative to store the respective first, second, third and fourth palette colors as sorted by luminance, respectively, in the first, fourth, third, and second fields of the array being created.

13. A personal computer system in accordance with claim 10 wherein:

said first means is operative to store said input pixel color values in said main memory in input frames;
and said third means collects said palette colors in output frames corresponding to said input frames, and transmits said output frames to said display means.

14. A personal computer system in accordance with claim 10 comprising:
expressing said digitized pixel color values in a first format, identifying other color values other than the digitized pixel color values for accessing said conversion table in a second format, and scaling said digitized pixel color values in said first format to said second format to thereby access said conversion table.

15. A personal computer system in accordance with claim 14 wherein said second means operates at a rate equal to the rate at which digitized pixel color values are produced by said source, said second means being controlled as a separate task under said operating system.

16. A personal computer system in accordance with claim 15 wherein said palette colors in said converted blocks are palette indexes which are transmitted by said third means to said display means.

17. The method of operating a personal computer system having a main memory for storing data and programs including a multitasking operating system, a microprocessor for executing programs stored in said main memory, a source of frames of video data with each frame comprising a series of digitized pixel color values, and a video display device for displaying video data comprising a series of palette colors, wherein said method comprises the steps of:
(a) storing in said main memory a conversion table having a plurality of created error diffusion arrays covering the color range of said pixel color values, each array in said table being for a different corresponding color value, each array being accessed using said corresponding color value as an index into said table, each array in said table having "n" fields respectively containing palette color values ordered in accordance with an order matrix by sorted luminance values, said palette color values being from a palette of quantized colors;
(b) storing in said main memory a series of input pixel color values from said source;
(c) processing said input pixel color values in blocks wherein each block has "n" values corresponding to "n" laterally and vertically adjacent pixels on a screen, said processing being done by
(c1) converting each block of input pixel color values into a corresponding converted block containing palette colors, by looking up in said conversion table for each input pixel color value in said each block the array indexed by such color value, and by setting a corresponding value in said corresponding converted block to a preordered palette color from such array;
and (c2) transmitting to said video display device said palette colors from said converted block;
and wherein said conversion table is created by:
(d) storing in said main memory a palette of quantized palette colors;
(e) for each different pixel color value, creating a corresponding error diffusion array in said conversion table by (e1) calculating, for each palette color in said palette, a Euclidean distance between such palette color and a first pixel color value from said series of input pixel color values, (e2) selecting a first palette color corresponding to which palette color has a minimum Euclidean distance from the first pixel color value, (e3) selecting (n−1) additional palette colors by adding color error differences between said first pixel color value and a palette color last selected to form a search color, by calculating Euclidean distances between said search color and each palette color in said palette, and by selecting another palette color having a minimum Euclidean distance, (e4) sorting said first palette color and (n−1) additional palette colors selected by said preceding steps in accordance with luminance thereof, (e5) reordering said palette colors as sorted by said preceding step in accordance with an order matrix, and (e6) storing said palette colors as reordered by said preceding step in consecutive fields of said corresponding array in said conversion table as a plurality of error diffusion arrays.

18. The method of operating a personal computing system in accordance with claim 17, wherein:
each block is a 2×2 block of pixel values, and "n" equals four to provide the first, a second, a third and a fourth palette color, and a first, a second, a third and a fourth field of each array.

19. The method of operating a personal computer system in accordance with claim 18, wherein:
said order matrix stores the respective first, second, third and fourth palette colors as sorted by luminance, respectively, in the first, fourth, third, and second fields of the array being created.

20. The method of operating a personal computer system in accordance with claim 17, wherein:
step (b) stores said input pixel color values in said main memory in input frames;
and step (c2) collects said palette colors in output frames corresponding to said input frames, and transmits said output frames to said video display device.

21. The method of operating a personal computer system in accordance with claim 20, wherein said processing step (c) is done at a rate which is equal to the rate at which input pixel color values are produced from said source, and said processing is done as a separate task under said operating system concurrently with receiving video data from said source and transmitting said output frames to said video display device, whereby said converting is done on a real-time basis.

22. The method of operating a personal computer system in accordance with claim 21, comprising expressing said palette colors in said converted blocks as palette indexes, and transmitting such indexes to said video display device.

23. The method of operating a personal computer system in accordance with claim 17, comprising:
expressing said input pixel color values in a first format, identifying other color values other than the input pixel color values for accessing said conversion table in a second format, and scaling said input pixel color values in said first format to said second format to thereby access said conversion table.

24. A personal computer system including a main memory for storing data and programs including a multitasking operating system, a microprocessor for executing programs stored in said main memory, a source of video data inputting a succession of frames of digitized pixel color values, and display means for displaying images colored in accordance with a palette of quantized colors, further comprising:

first means for receiving and storing in said main memory a succession of said digitized pixel color values;

a conversion table stored in said main memory, said conversion table containing a plurality of error diffusion arrays covering the color range of said pixel color values, each array in said table being for a different corresponding color value, each array being accessed using said corresponding color value as an index into said table, each array in said table having "n" fields respectively containing palette color values ordered in accordance with an order matrix by sorted luminance values, said palette color values being from a palette of quantized colors;

second means for processing said input pixel color values in blocks wherein each block has "n" values corresponding to "n" laterally and vertically adjacent pixels on a screen, said processing being done by converting each block of input pixel color values into a corresponding converted block containing palette colors, by looking up in said conversion table for each input pixel color value in said each block the array indexed by such color value, and by setting a corresponding value in said corresponding converted block to a preordered palette color from such array;

and third means for transmitting to said display means said palette colors from said converted block.

25. A personal computer system in accordance with claim 24, wherein said conversion table is created by:
(d) storing in said main memory a palette of quantized palette colors;
(e) for each different pixel color value, creating a corresponding array in said conversion table by (e1) calculating, for each palette color in said palette, a Euclidean distance between such palette color and a first pixel color value from said digitized pixel color values, (e2) selecting a first palette color corresponding to which palette color has a minimum Euclidean distance from the first pixel color value, (e3) selecting (n−1) additional palette colors by adding color error differences between said first pixel color value and a palette color last selected to form a search color, by calculating Euclidean distances between said search color and each palette color in said palette, and by selecting another palette color having a minimum Euclidean distance, (e4) sorting said first palette color and (n−1) additional palette colors selected by said preceding steps in accordance with luminance thereof, (e5) reordering said palette colors as sorted by said preceding step in accordance with an order matrix, and (e6) storing said palette colors as reordered by said preceding step in consecutive fields of said corresponding array in said conversion table.

26. A personal computing system in accordance with claim 25, wherein:

each block is a 2×2 block of pixel values, and "n" equals four to provide the first, a second, a third and a fourth palette color, and a first, a second, a third and a fourth field of each array.

27. A personal computer system in accordance with claim 26, wherein:

said order matrix is operative to store the respective first, second, third and fourth palette colors as sorted by luminance, respectively, in the first, fourth, third, and second fields of the array being created.

28. A personal computer system in accordance with claim 25, wherein:

said first means is operative to store said input pixel color values in said main memory in input frames; and said third means collects said palette colors in output frames corresponding to said input frames, and transmits said output frames to said display means.

29. A personal computer system in accordance with claim 25, comprising:

expressing said digitized pixel color values in a first format, identifying other color values other than the digitized pixel color values for accessing said conversion table in a second format, and scaling said digitized pixel color values in said first format to said second format to thereby access said conversion table.

30. A personal computer system in accordance with claim 29, wherein said second means operates at a rate equal to the rate at which digitized pixel color values are produced by said source, said second means being controlled as a separate task under said operating system.

31. A personal computer system in accordance with claim 30, wherein said palette colors in said converted blocks are palette indexes which are transmitted by said third means to said display means.

* * * * *